United States Patent
Nakajo

(10) Patent No.: US 7,242,011 B2
(45) Date of Patent: Jul. 10, 2007

(54) RADIATION IMAGE FORMING UNIT AND CASSETTE

(75) Inventor: Masakazu Nakajo, Minamiashigara (JP)

(73) Assignee: Fujifilm Corporation, Tokyo (JP)

( * ) Notice: Subject to any disclaimer, the term of this patent is extended or adjusted under 35 U.S.C. 154(b) by 189 days.

(21) Appl. No.: 10/787,392

(22) Filed: Feb. 27, 2004

(65) Prior Publication Data

US 2004/0169150 A1    Sep. 2, 2004

(30) Foreign Application Priority Data

Feb. 28, 2003    (JP)    ............................. 2003-054316
Feb. 28, 2003    (JP)    ............................. 2003-054734

(51) Int. Cl.
*H05B 33/00* (2006.01)
(52) U.S. Cl. .................. 250/484.4; 250/580; 250/589; 250/581; 250/582; 250/584; 250/588
(58) Field of Classification Search ............ 250/484.4, 250/580, 589, 581, 582, 584, 588
See application file for complete search history.

(56) References Cited

U.S. PATENT DOCUMENTS

| | | | |
|---|---|---|---|
| 4,681,227 A * | 7/1987 | Tamura et al. .............. 206/455 |
| 4,975,590 A | 12/1990 | Tanaka | |
| 5,065,866 A * | 11/1991 | Boutet et al. ............... 206/455 |
| 5,773,832 A * | 6/1998 | Sayed et al. ........... 250/370.09 |
| 5,943,390 A * | 8/1999 | Wendlandt et al. ......... 378/189 |
| 6,158,888 A * | 12/2000 | Walker et al. .............. 378/169 |
| 6,969,861 B2 * | 11/2005 | Shoji et al. .............. 250/484.4 |
| 2001/0050975 A1 * | 12/2001 | Nakajo ....................... 378/182 |

FOREIGN PATENT DOCUMENTS

| | | |
|---|---|---|
| JP | 8-33596 B2 | 3/1996 |
| JP | 2000-249795 A | 9/2000 |
| JP | 2002-156716 A | 5/2002 |

* cited by examiner

*Primary Examiner*—David Porta
*Assistant Examiner*—Christine Sung
(74) *Attorney, Agent, or Firm*—Sughrue Mion, PLLC

(57) ABSTRACT

A radiation image forming unit has a stimulable phosphor sheet and a case. The stimulable phosphor sheet includes a phosphor layer and a frame covering the four sides of the phosphor layer. The frame has a recess, and a lead sheet for blocking backward scattered rays is replaceably mounted in the recess by a double-sided tape. The radiation image forming unit may be used without the lead sheet. The lead sheet may be replaced with another lead sheet having a different thickness.

12 Claims, 15 Drawing Sheets

RADIATION IMAGE FORMING UNIT AND CASSETTE

BACKGROUND OF THE INVENTION

1. Field of the Invention

The present invention relates to a radiation image forming unit comprising a stimulable phosphor sheet and a case housing the stimulable phosphor sheet, and a radiation image forming cassette for housing the stimulable phosphor sheet.

2. Description of the Related Art

There is known a system which employs a stimulable phosphor which, when exposed to radiation (X-rays, α-rays, β-rays, γ-rays, electron beams, ultraviolet radiation, or the like), stores a part of the energy of the radiation, and, when subsequently exposed to stimulating light such as visible light, emits light in proportion to the intensity of the stored energy of the radiation. In the system, the radiation image information of a subject such as a human body or the like is reproduced on a photographic photosensitive medium or the like or output as a visible image on a CRT or the like.

The above system has, integrally or individually, an imaging device for temporarily recording (imaging) the radiation image information of a subject such as a human body or the like on a stimulable phosphor sheet which comprises a stimulable phosphor layer (image recording layer) in the form of a sheet, a reading device for applying stimulating light such as a laser beam to the stimulable phosphor sheet to cause the stimulable phosphor sheet to emit light representing the recorded radiation image information and photoelectrically reading the emitted light, and an erasing device for erasing radiation image information that remains on the stimulable phosphor sheet after the emitted light is read.

For handling such a stimulable phosphor sheet with greater ease, there is normally employed a radiation image forming unit having a stimulable phosphor sheet housed in a case such as a magazine, a cassette, or the like. A cassette, known as such a radiation image forming unit, is disclosed in Japanese laid-open patent publication No. 2002-156716, for example.

As shown in FIG. 14 of the accompanying drawings, the disclosed cassette has a front panel 1 and a back panel 2. The back panel 2 includes a back panel body 2a having a plurality of spaced ribs 2b, and a thin plate 3 bonded to the ribs 2b. The back panel 2 also has a lead plate (radiation shield plate) 4 mounted on the thin plate 3, a thin plate 5 fixedly mounted on the lead plate 4, and a support plate 6 replaceably bonded to the thin plate 5 by a double-sided tape or the like. A stimulable phosphor sheet 7 is fixedly mounted on the support plate 6.

The front panel 1 and the back panel 2 can be fixed to each other by a lock mechanism (not shown). The stimulable phosphor sheet 7 is exposed to radiation through the front panel 1. For reading radiation image information recorded on the stimulable phosphor sheet 7, the front panel 1 and the back panel 2 are separated from each other, and the stimulable phosphor sheet 7 and the back panel 2 are placed together in a reading position in a reading device.

The effect that scattered rays have on the stimulable phosphor sheet 7 generally differs depending on imaging applications and conditions. In some cases, no radiation shield plate may be required, and in other cases, a relatively thick radiation shield plate may be required.

According to the disclosure of Japanese laid-open patent publication No. 2002-156716, the lead plate 4 for blocking backward scattered rays is sandwiched between the thin plates 3, 5 and unpeelably fixed to the back panel body 2a. Consequently, the disclosed cassette cannot make itself easily adaptable to different imaging applications and conditions. Even when no radiation shield plate is required, the lead plate 4 fixedly remains sandwiched between the thin plates 3, 5, making the cassette unduly heavy.

There has been known a process for recording the radiation image information of a subject simultaneously on a plurality of stimulable phosphor sheets to perform energy subtraction processing on radiation images. According to the energy subtraction processing, a plurality of radiation images recorded (captured) under different radiation energy absorbing conditions are photoelectrically read to generate digital image signals, and the digital image signals are subjected to a subtraction process at respective pixels of images for obtaining differential signals to extract particular body structures (soft tissues of internal organs, bones, etc.) having different energy absorbing characteristics of a subject whose radiation image has been recorded.

For example, a plate-like filter made of metal (radiation energy separating filter) for absorbing a low radiation energy component is interposed between two stimulable phosphor sheets, and the two stimulable phosphor sheets are simultaneously exposed to radiation that has passed through a subject. The two stimulable phosphor sheets are thus irradiated with radiations having different energy distributions.

In such a process, the two stimulable phosphor sheets and the plate-like filter are stored in a cassette when they are exposed to radiation. After the exposure, the stimulable phosphor sheets are removed from the cassette and placed in the reading device, which then reads the recorded radiation image information from the stimulable phosphor sheets. One such cassette is disclosed in Japanese patent publication No. 8-33596, for example.

Specifically, as shown in FIG. 15 of the accompanying drawings, a cassette 1a that is disclosed in Japanese patent publication No. 8-33596 comprises two stimulable phosphor sheets 7a and a cassette casing 4a for storing the two stimulable phosphor sheets 7a and also a radiation energy conversion filter 3a such as a copper plate disposed between the two stimulable phosphor sheets 7a. The cassette 1a also has a lid 5a openably and closably mounted on the cassette casing 4a. The cassette casing 4a has a slit 6a defined in a side wall thereof for taking the radiation energy conversion filter 3a into and out of the cassette casing 4a therethrough in the directions indicated by the arrow B.

When the cassette 1a is loaded into a loader (not shown) after the stimulable phosphor sheets 7a have been exposed to radiation, the lid 5a is opened, and one of the stimulable phosphor sheets 7a is removed from the cassette casing 4a. Then, the cassette 1a is unloaded from the loader, and the radiation energy conversion filter 3a is removed from the cassette casing 4a through the slit 6a. Thereafter, the cassette 1a is loaded into the loader again, and the second stimulable phosphor sheet 7a is removed from the cassette casing 4a.

According to the disclosure of Japanese patent publication No. 8-33596, the cassette 1a needs to be unloaded from the loader to remove the radiation energy conversion filter 3a when the radiation image information stored in the second stimulable phosphor sheet 7a is to be read. Consequently, it is relatively tedious and time-consuming to handle the cassette 1a. There has been a demand for a simpler process of handling the cassette 1a.

SUMMARY OF THE INVENTION

It is a general object of the present invention to provide a radiation image forming unit in which a sheet member of a different material is removed when necessary so that the radiation image forming unit can be used in various applications, and the radiation image of lightweight can be handled with ease.

A major object of the present invention is to provide a radiation image forming unit which is of a simple structure, can be handled with ease, and permits various processing operations such as energy subtraction processing to be performed efficiently.

A radiation image forming unit according to the present invention has a stimulable phosphor sheet assembly and a cassette for storing the stimulable phosphor sheet. The stimulable phosphor sheet or the cassette is associated with a removable sheet member of a different material, e.g., a radiation shield plate for blocking scattered rays, a radiation energy separating filter, or the like. If the sheet member of the different material is not required depending on imaging applications and conditions, then the sheet member of the different material may be removed from the radiation image forming unit. Furthermore, sheet members of various different materials having different thicknesses may be used replaceably.

The radiation image forming unit can make itself easily adaptable to different imaging applications and conditions. When the sheet member of the different material is not required, it may be removed and the radiation image forming unit may be used without a sheet member of a different material. In this case, the radiation image forming unit is reduced in overall weight. The radiation image forming unit can be used in various applications. The radiation image forming unit is lightweight, and can be handled with ease.

The stimulable phosphor sheet or the case has a recess, and the sheet member of the different material is removably mounted in the recess by a fastening member. Therefore, the sheet member of the different material is prevented from projecting from the surface (reverse surface) of the stimulable phosphor sheet or the surface of the case (surface which is exposed to radiation or the surface opposite to the surface which is exposed to radiation) into interference with other members.

A radiation image forming cassette according to the present invention has a sheet member of a different material from the radiation image forming cassette. The sheet member is mounted on at least one surface of the radiation image forming cassette. The sheet member of the different material may comprise a radiation energy separating filter, a lead sheet for blocking backward dispersed rays, an RFP sheet for achieving high strength, a white board that can be handwritten, a magnetic sheet for delivering a cassette, a sheet on which a scale is printed, a sheet on which imaging positions are printed, a sheet on which a lead mark is provided or the like.

Depending on the application of the radiation image forming cassette, any of various sheet members may be mounted on the surface of the cassette (surface which is exposed to radiation or the surface opposite to the surface which is exposed to radiation). A process of manufacturing the cassette is easily simplified. The radiation image forming cassette allows various processes to be performed efficiently in connection therewith, and the radiation image forming cassette is economical.

When an ordinary cassette and a cassette combined with a radiation energy separating filter, for example, are stacked together and exposed to radiation, the stimulable phosphor sheets stored respectively in the cassettes record thereon radiation image information under different radiation energy absorbing conditions. Then, the cassettes are loaded into a reading device, which can reliably and easily extract image information representing particular body structures (soft tissues of internal organs, bones, etc.) having different energy absorbing characteristics of the subject.

The radiation image forming cassette has a recess defined in one surface thereof, and the sheet member of the different material is mounted in the recess. When the radiation image forming cassette is handled, the sheet member of the different material is prevented from being peeled off the radiation image forming cassette, and hence the radiation image forming cassette can easily be handled.

Since the sheet member of the different material is removably attached to the radiation image forming cassette, the same radiation image forming cassette can be used in various different processes, and is economical.

The radiation image forming cassette has a thickness which is at most ½ of a standard value according to ISO 4090. The radiation image forming cassette is thus of such a small thickness that two cassettes may be placed together on an existing case support base. As a result, the imaging device itself may easily be simplified in structure.

In one embodiment, a pair of cassettes are stacked together. Protrusions are formed on a frame of one of the pair of cassettes, and recesses are formed on a frame of the other of the pair of cassettes, respectively. The protrusions are fitted in the recesses such that the pair of cassettes are in alignment with each other accurately. Thus, energy subtraction processing can be performed efficiently with high degree of accuracy.

A marking may be provided in an image recording area for recording an image by applying radiation to the image recording area. For example, the marking is made of lead, a coating material containing lead, or an ink containing lead. In the energy subtraction processing, positions of the radiation images recorded on the stimulable phosphor sheets in the cassettes are adjusted easily and accurately such that these radiation images are in alignment with each other.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
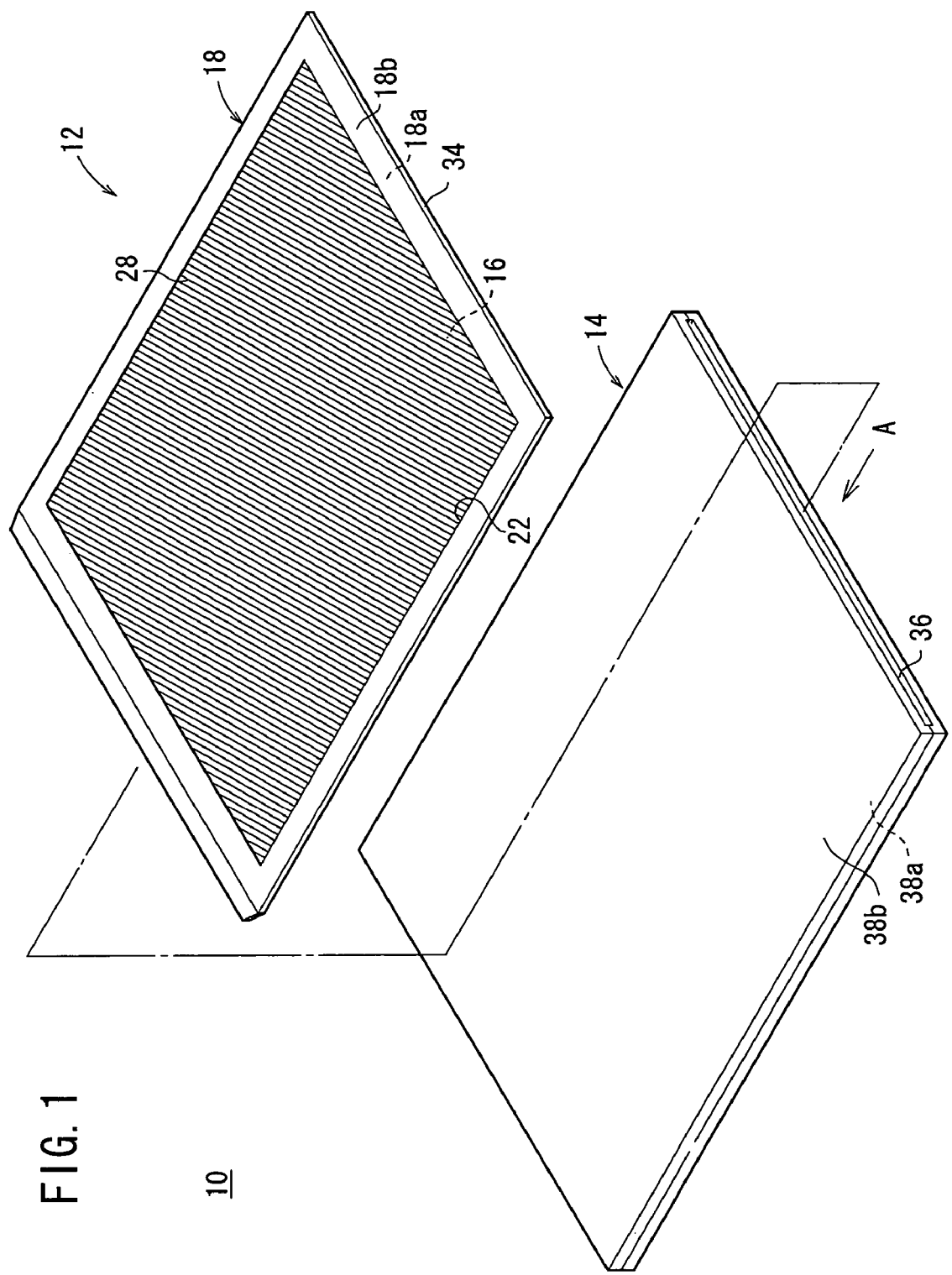
FIG. 1 is a perspective view of a radiation image forming unit according to a first embodiment of the present invention.

FIG. 1 shows in perspective a radiation image forming unit 10 according to a first embodiment of the present invention.

As shown in FIG. 1, the radiation image forming unit 10 comprises a stimulable phosphor sheet assembly 12 and a case (cassette) 14 storing the stimulable phosphor assembly sheet 12. The stimulable phosphor sheet assembly 12 comprises a rectangular phosphor layer 16 serving as a radiation image recording region and a frame 18 covering the four sides of the phosphor layer 16.

The phosphor layer 16 may comprise, for example, a hard sheet in the form of a support board made of a hard material such as glass or the like and columnar phosphor bodies evaporated on the support board. The phosphor layer 16 may be produced by a vacuum evaporation process in which a stimulable phosphor is heated and evaporated in a vacuum container and deposited on the support board, or a sputtering, a CVD process, or an ion plating process.

The phosphor layer 16 thus formed has phosphor bodies in the shape of columns substantially perpendicular to the plane of the phosphor layer 16. The phosphor bodies are optically independent of each other and highly sensitive to radiation applied thereto. The phosphor layer 16 is capable reproducing clear images with fine granularity in which scattering of stimulating light is small.

Alternatively, the phosphor layer 16 may comprise a flexible sheet having a support board coated with phosphor material (see, for example, Japanese laid-open patent publication No. 2000-249795). The stimulable phosphor sheet 12 is not limited to the structure using the frame 18, but may employ a flexible sheet disclosed in Japanese laid-open patent publication No. 2000-249795.

The frame 18 is made of a thermoplastic resin such as an ABS resin, a polycarbonate resin, or a polymer alloy of ABS and polycarbonate (polycarbonate ABS resin).

Figure 2:
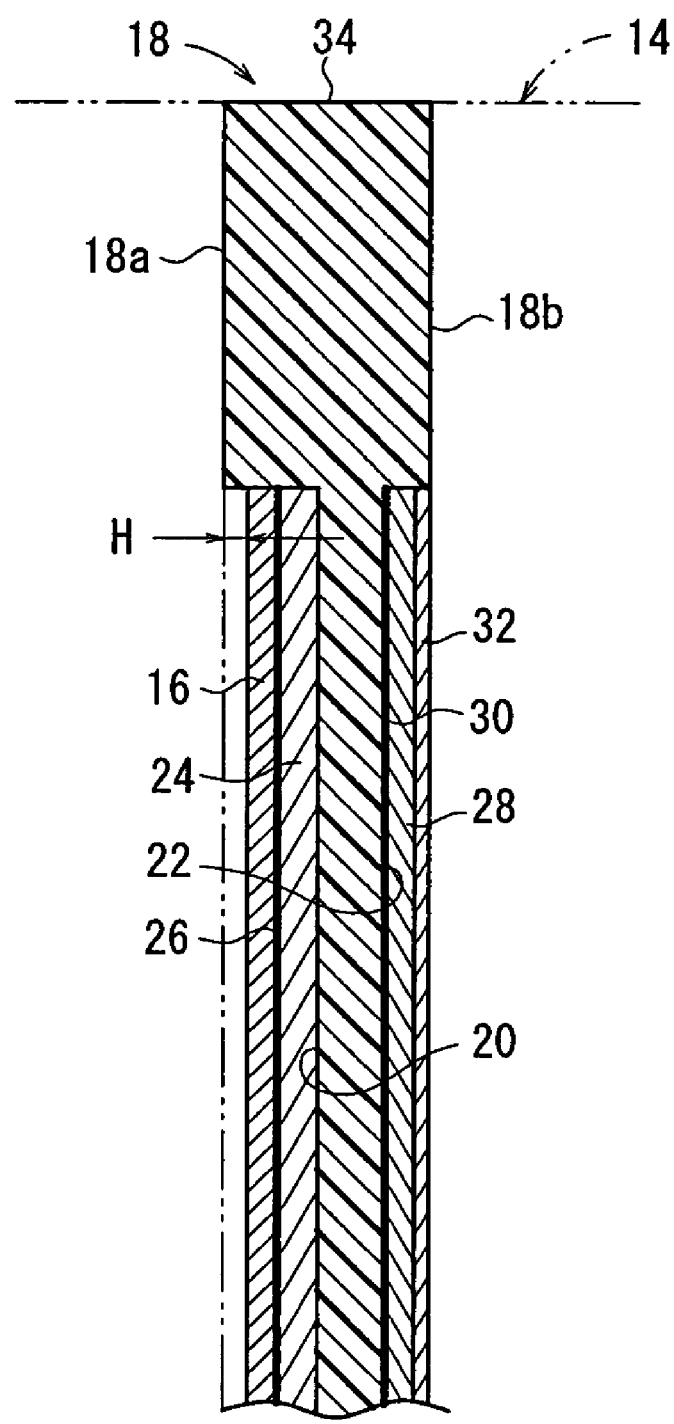
FIG. 2 is a fragmentary cross-sectional view of a stimulable phosphor sheet assembly of the radiation image forming unit shown in FIG. 1.

As shown in FIG. 2, the frame 18 has a relatively deep first recess 20 defined in its surface 18a near the phosphor layer 16 and a relatively shallow second recess 22 defined in its reverse surface 18b remote from the phosphor layer 16.

A carbon plate 24 is embedded in the first recess 20 by an insert molding process, for example. The phosphor layer 16 is replaceably provided on the surface of the carbon plate 24 by a double-sided tape 26, for example. The phosphor layer 16 has a front surface spaced inwardly from the plane of the surface 18a of the frame 18 by a distance H (H<1 mm). A sheet (radiation shield plate) 28 for blocking backward scattered rays such as a lead sheet is replaceably provided in the second recess 22 by a fastening member, e.g., a double-sided tape 30. A protective plastic sheet 32 is mounted on the surface of the lead sheet 28.

As shown in FIG. 1, the frame 18 has an end face 34 which serves as a trailing end when the stimulable phosphor sheet assembly 12 is inserted into the case (cassette) 14 in the direction indicated by the arrow A. The end face 34 provides a case (cassette) end face of the case (cassette) 14. The color of the end face 34 is different from the color of the other surfaces for preventing the stimulable phosphor sheet assembly 12 from being inserted into the case (cassette) 14 in a wrong direction.

The case (cassette 14 has a rectangular shape and has an opening 36 for inserting and discharging the stimulable phosphor sheet assembly 12 therethrough. When the frame 18 is placed into the case (cassette) 14 through the opening 36, the end face 34 of the frame 18 provides the case (cassette) end face of the case (cassette) 14 (see FIG. 2).

In FIG. 1, the case (cassette) 14 has a surface 38a exposed to radiation for recording the radiation image information of a subject by an imaging device (not shown), and a reverse surface 38b opposite to the surface 38a. When the stimulable phosphor sheet assembly 12 is placed in the case (cassette) 14, the phosphor layer 16 is positioned near the surface 38a, and the lead sheet 28 is positioned near the reverse surface 38b.

Operation of the radiation image forming unit 10 will be described below.

The radiation image forming unit 10 with the stimulable phosphor sheet assembly 12 stored in the case (cassette) 14 is loaded into the non-illustrated imaging device. Then, radiation of image information of a subject (not shown) is applied through the surface 38a of the (cassette) case 14 to the phosphor layer 16 of the stimulable phosphor sheet assembly 12. Thus, the radiation image information of the subject is recorded on the phosphor layer 16.

Then, the radiation image forming unit 10 is loaded into a processing device (not shown). In the processing device, the stimulable phosphor sheet 12 is removed from the case 14, and delivered to a processing unit (reading unit). The processing unit reads the radiation image information recorded on the phosphor layer 16. Thereafter, remaining radiation image information is erased from the phosphor layer 16, and the stimulable phosphor sheet 12 is inserted back into the case 14.

According to the first embodiment, as shown in FIG. 2, the frame 18 of the stimulable phosphor sheet 12 has the second recess 22, and the lead sheet 28 is replaceably mounted in the second recess 22 by the double-sided tape 30.

If the lead sheet 28 is not required in certain imaging applications or conditions, for example, then the lead sheet 28 may be removed from the stimulable phosphor sheet 12, and the stimulable phosphor sheet 12 is used without the lead sheet 28. If a radiation shield plate thicker than the lead sheet 28 attached to the frame 18 is required, then the lead sheet 28 may be removed from the frame 18 and another lead sheet 28 having a desired thickness may be mounted in the second recess 22 of the frame 18 by the double-sided tape 30.

According to the first embodiment, the radiation image forming unit 10 can be used in various imaging applications and conditions. When the lead sheet 28 is not required, the lead sheet 28 is removed from the frame 18, and the stimulable phosphor sheet 12 is used without the lead sheet 28. In this case, the radiation image forming unit 10 has a reduced overall weight. The radiation image forming unit 10 can be used in various applications. The radiation image forming unit 10 is lightweight, and can be handled with ease.

As described above, the frame 18 has the second recess 22, and the lead sheet 28 is replaceably provided in the second recess 22. The lead sheet 28 does not project from the reverse side 18b of the frame 18 (see FIG. 2), and hence will not interfere with other members when the stimulable phosphor sheet 12 is fed and processed in the processing device, for example.

According to the first embodiment, the double-sided tape 30 is used as the fastening member, and the lead sheet 28 is attached to the frame 18 by the double-sided tape 30. However, the fastening member is not limited to the double-sided tape 30. A magnet, a clip, a Velcro (registered trademark) fastener, or the like may be used as the fastening member. Alternatively, the lead sheet 28 may be fixed to the frame 18 by an adhesive or the like. These modifications are also applicable to second through fifth embodiments described below.

Figure 3:
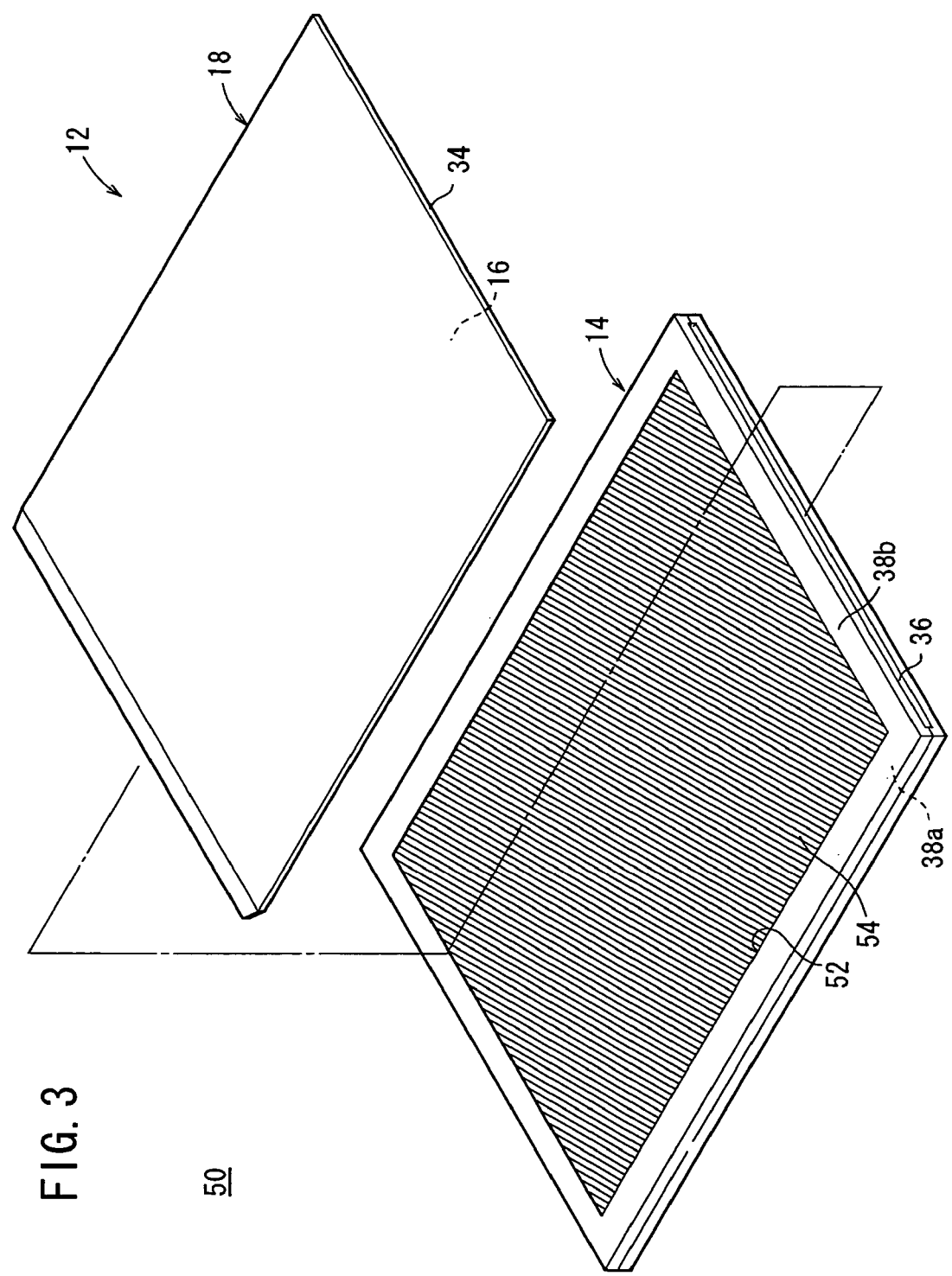
FIG. 3 is a perspective view of a radiation image forming unit according to a second embodiment of the present invention.

FIG. 3 shows in perspective a radiation image forming unit 50 according to a second embodiment of the present invention. The constituent elements that are identical to those of the radiation image forming unit 10 according to the first embodiment are labeled with the same reference numeral, and description thereof will be omitted.

Figure 4:
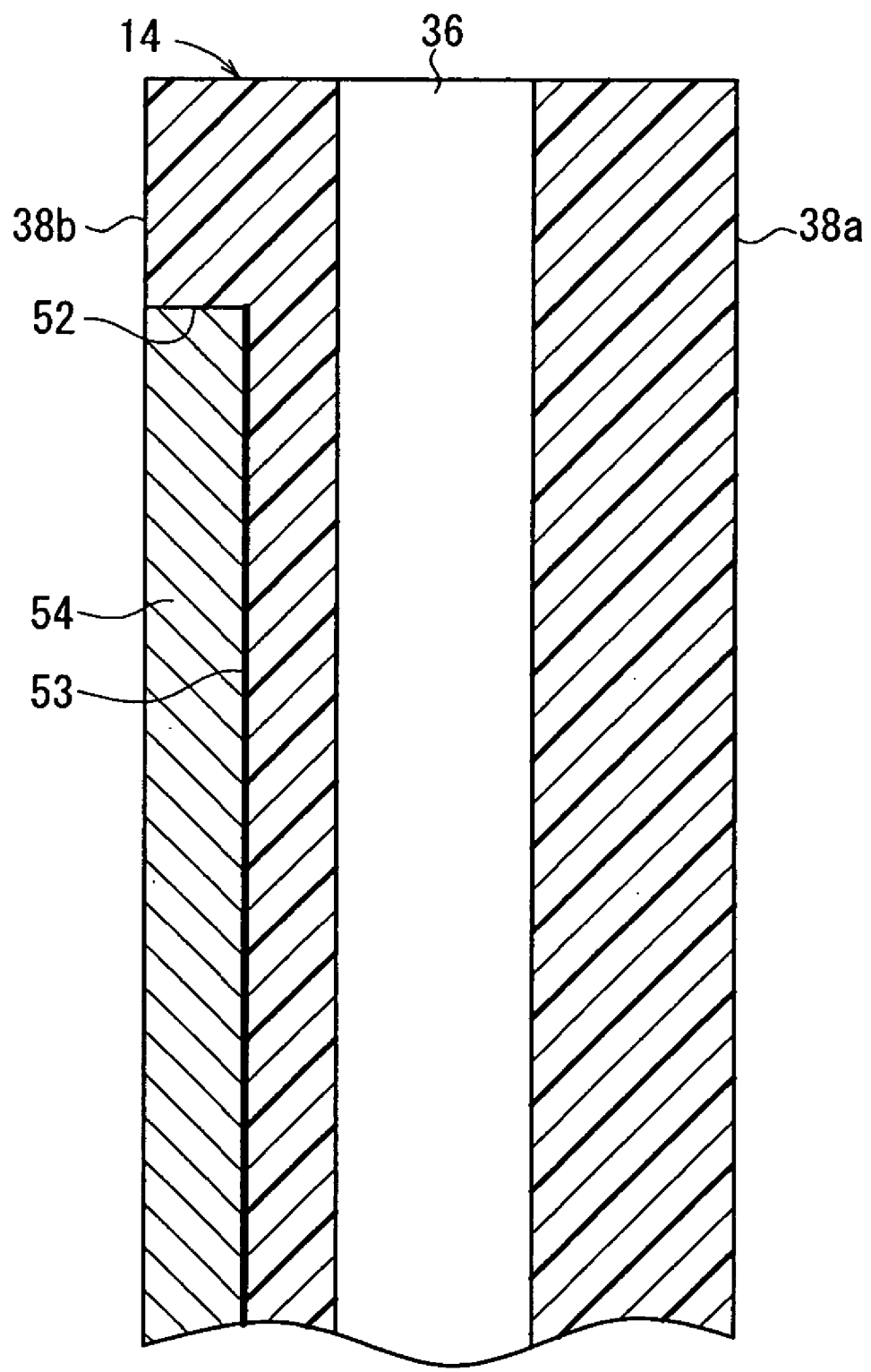
FIG. 4 is a fragmentary cross-sectional view of a case of the radiation image forming unit shown in FIG. 3.

The radiation image forming unit 50 has a case 14 with a rectangular recess 52 defined in a reverse surface 38b thereof. As shown in FIG. 4, a lead sheet 54 is replaceably mounted in the recess 52 by a fastening member, e.g., a double-sided tape 53. The stimulable phosphor sheet 12 does not employ the lead sheet 28.

In the second embodiment, the lead sheet 54 is removably provided on the reverse surface 38b of the case 14. Therefore, the lead sheet 54 may be removed depending on imaging applications and conditions, or may be replaced with another lead sheet 54 having a thickness different from the thickness of the lead sheet 54. The radiation image forming unit 50 according to the second embodiment offers the same advantages as the first embodiment. The radiation image forming unit 50 can be used in various applications. The radiation image forming unit is lightweight, and can be handled with ease.

In the second embodiment, the lead sheet 54 is attached to the reverse surface 38b of the case 14. Alternatively, the lead sheet 54 may be attached to an inner surface of the case 14 in which the stimulable phosphor sheet 12 is stored.

Figure 5:
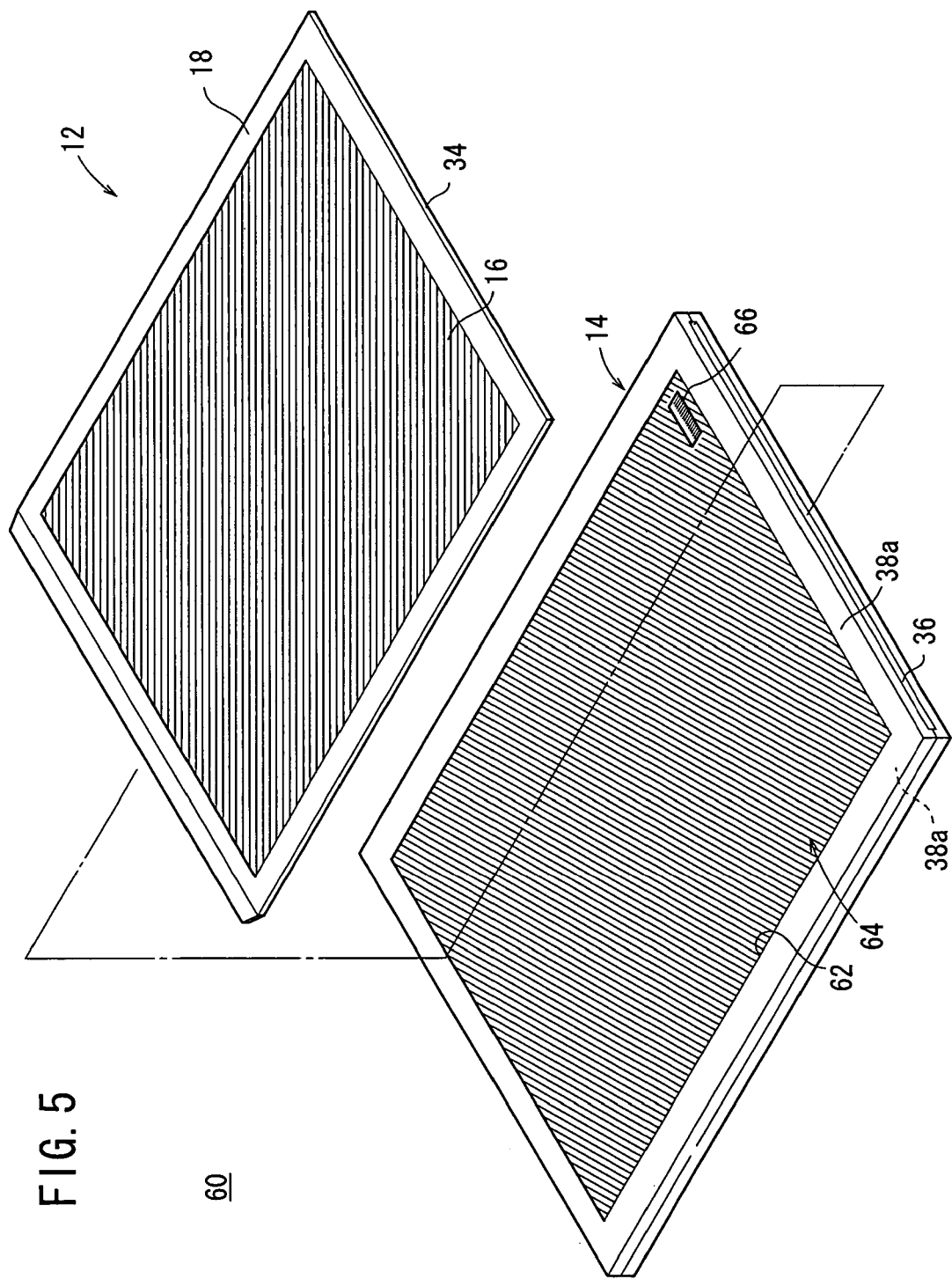
FIG. 5 is a perspective view of a radiation image forming unit according to a third embodiment of the present invention.

FIG. 5 shows in perspective a radiation image forming unit 60 according to a third embodiment of the present invention. The constituent elements that are identical to those of the radiation image forming unit 50 according to the second embodiment are labeled with the same reference numeral, and description thereof will be omitted.

Figure 6:
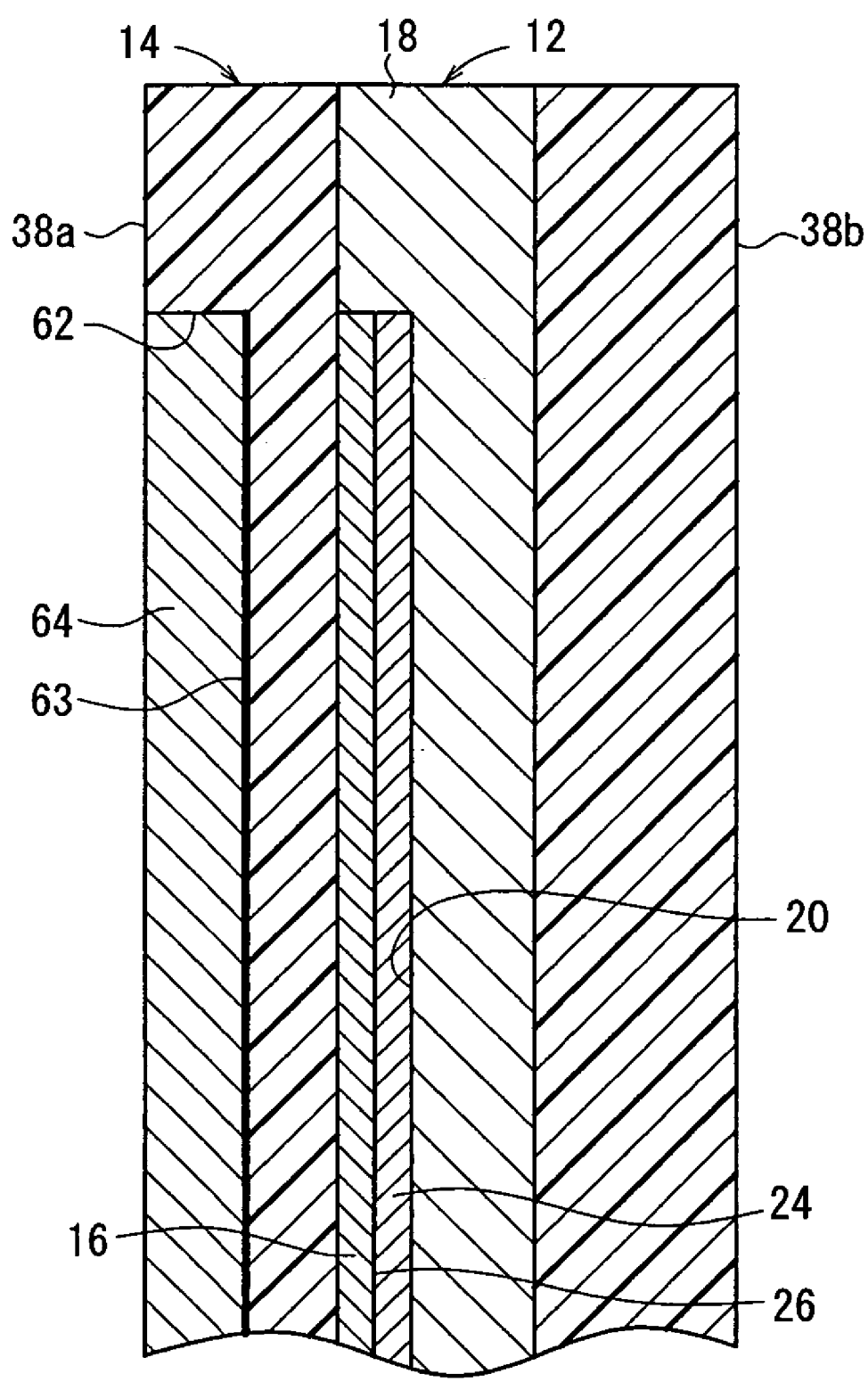
FIG. 6 is a fragmentary cross-sectional of the radiation image forming unit.

The radiation image forming unit 60 has a case 14 with a rectangular recess 62 in its surface 38b exposed to radiation. As shown in FIG. 6, a sheet 64 is replaceably mounted in the recess 62 by a fastening member, e.g., a double-sided tape 63. A scale 66 is printed on the sheet 64, for example.

The case 14 stores the stimulable phosphor sheet 12 as shown in FIG. 6. The carbon plate 24 is embedded in the first recess 20 of the frame 18 as necessary. The phosphor layer 16 is replaceably provided on the surface of the carbon plate 24 by the double-sided tape 26.

In the fifth embodiment, the scale 66 is printed on the sheet 64 which is replaceably attached to the surface 38a of the case 14. Therefore, when radiation of image information is applied through the surface 38a of the case 14 to the phosphor layer 16 of the stimulable phosphor sheet 12, the radiation image information of the subject, and the information of the scale 66 are recorded on the phosphor layer 16.

In the fifth embodiment, the scale 66 is printed on the sheet 64. Alternatively, positions of the subject (not shown) which is imaged by the imaging device may be printed on the sheet 64, or lead may be provided on the sheet 64 for marking purpose.

Figure 7:
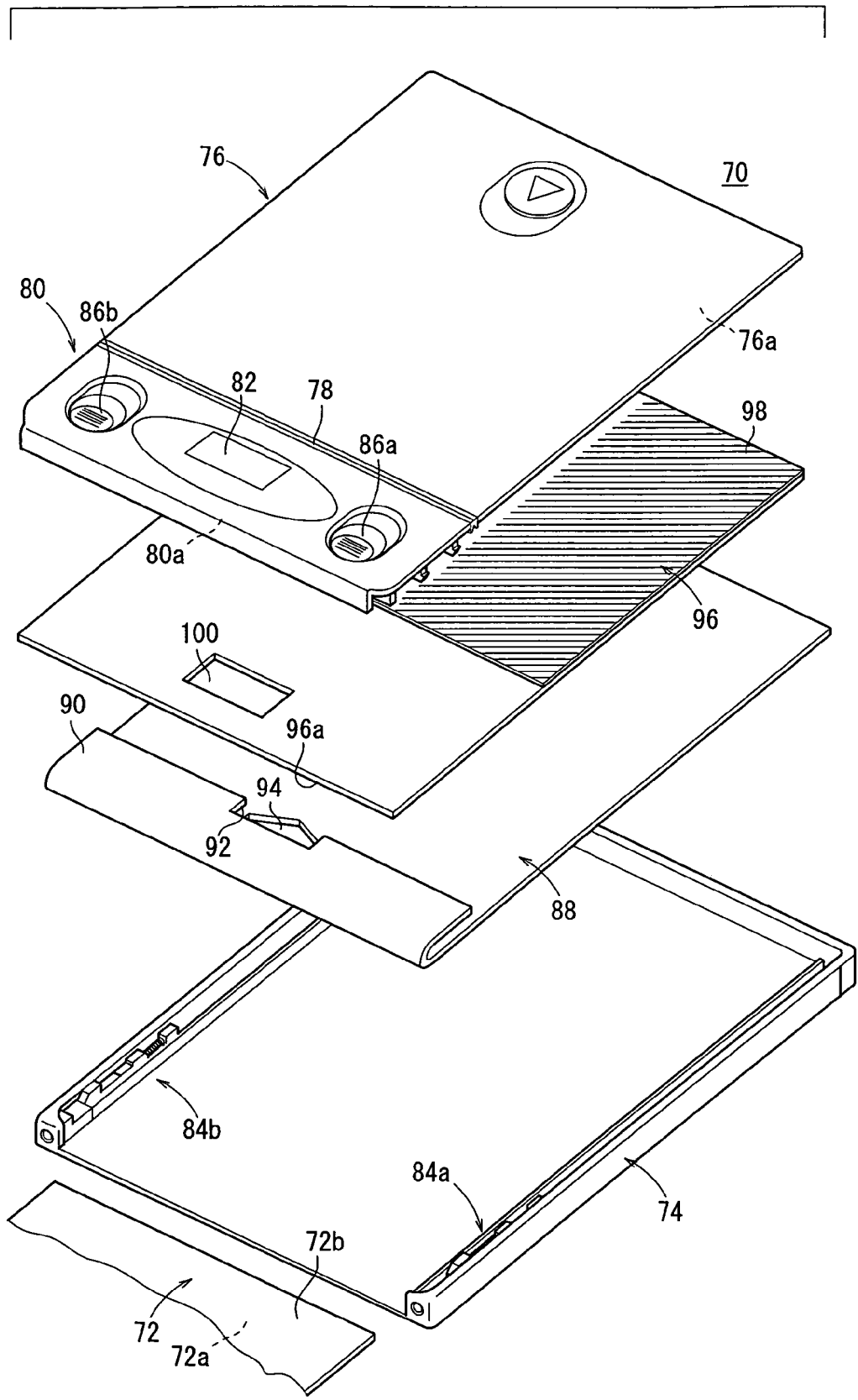
FIG. 7 is an exploded perspective view of a case of a radiation image forming unit according to a fourth embodiment of the present invention.

FIG. 7 shows in exploded perspective a case (cassette) 70 of a radiation image forming unit according to a fourth embodiment of the present invention.

The case (cassette) 70 has a casing (frame) 74 for storing a stimulable phosphor sheet 72. A light shield plate 76 is detachably mounted in the casing (frame) 74. The light shield plate 76 has a lid 80 angularly movably attached thereto by a hinge 78. The lid 80 is openably and closably mounted on the casing (frame) 74.

The lid 80 has a window 82 for reading a bar code therethrough. Lock means 84a, 84b for locking the lid 80 to the casing 74 are mounted on the lid 80 on both sides of the window 82 and the casing 74. The lock means 84a, 84b can be unlocked by moving knobs 86a, 86b mounted on the lid 80 for opening the lid 80 from the casing 74.

A guide sheet 88 comprising a resin sheet, e.g., a polypropylene sheet, has an end 90 fixed to a reverse surface 80a of the lid 80. The end 90 has a recess 92 in alignment with the window 82. The guide sheet 88 has an opening 94 defined in a portion folded back over the casing 74 also in alignment with the window 82.

A lead sheet 96 is removably fastened to a reverse surface 76a of the light shield plate 76 by a fastening member, e.g., a double-sided tape 98. The lead sheet 96 has a free end 96a extending toward and beneath the lid 80 and having an opening 100 also in alignment with the window 82.

According to the fourth embodiment, as described above, the lead sheet 96 is removably attached to the reverse surface 76a of the light shield plate 76 by the fastening member, e.g., the double-sided tape 98. The light shield plate 76 is removably mounted on the casing 74 by stopper pins or the like (not shown).

The light shield plate 76 can be removed from the casing 74, and the lead sheet 96 can be detached from the light shield plate 76 or can be replaced with another lead sheet 96 having a different thickness. Thereafter, the light shield plate 76 can be mounted on the casing 74. The radiation image forming unit according to the fourth embodiment offers the same advantages as the first through third embodiments, i.e., it can be used in various applications, it is lightweight, and handled with ease.

Figure 8:
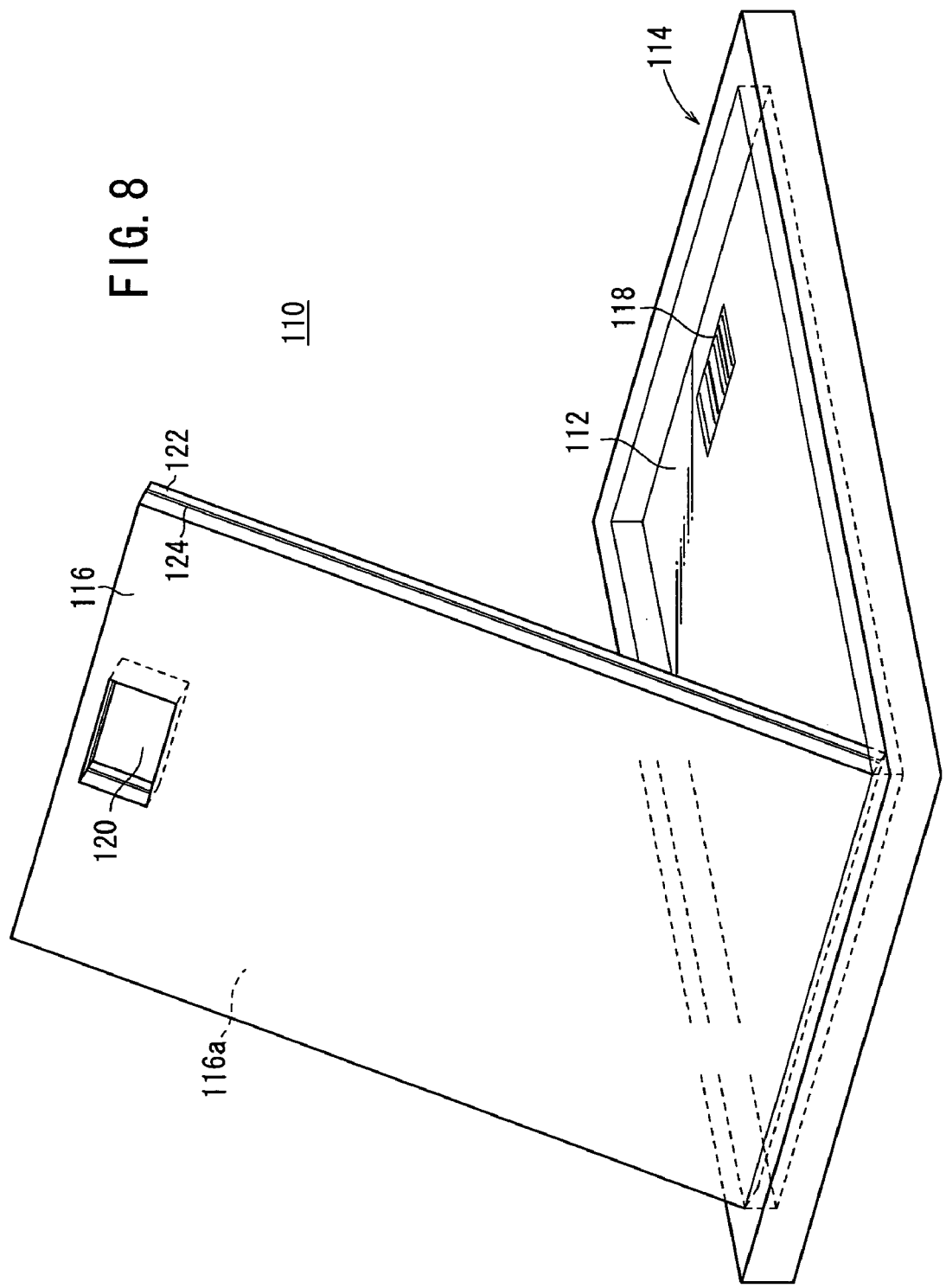
FIG. 8 is a perspective view of a case of a radiation image forming unit according to a fifth embodiment of the present invention.

FIG. 8 shows in perspective a case (cassette) 110 of a radiation image forming unit according to a fifth embodiment of the present invention.

The case (cassette) 110 comprises a casing (frame) 114 for storing a stimulable phosphor sheet 112 and a lid 116 openably and closably mounted on the casing (frame) 114. The stimulable phosphor sheet 112 placed in the casing 114 has a surface supporting a phosphor layer thereon and facing an inner wall surface of the casing 114. A bar-code label 118 is applied to a reverse surface of the stimulable phosphor sheet 112.

The lid 116 has a window 120 which is in alignment with the bar-code label 118 when the lid 116 is in the closed position over the casing 114. A lead sheet 122 is removably attached to an inner wall surface 116a of the lid 116, except for the window 120, by a fastening member, e.g., a double-sided tape 124.

According to the fifth embodiment, the lead sheet 122 is removably attached by the double-sided tape 124 to the inner wall surface 116a of the lid 116 which is openably and closably mounted on the casing 114. The lead sheet 122 removed depending on imaging applications and conditions, or may be replaced with another lead sheet 122 having a different thickness.

Figure 9:
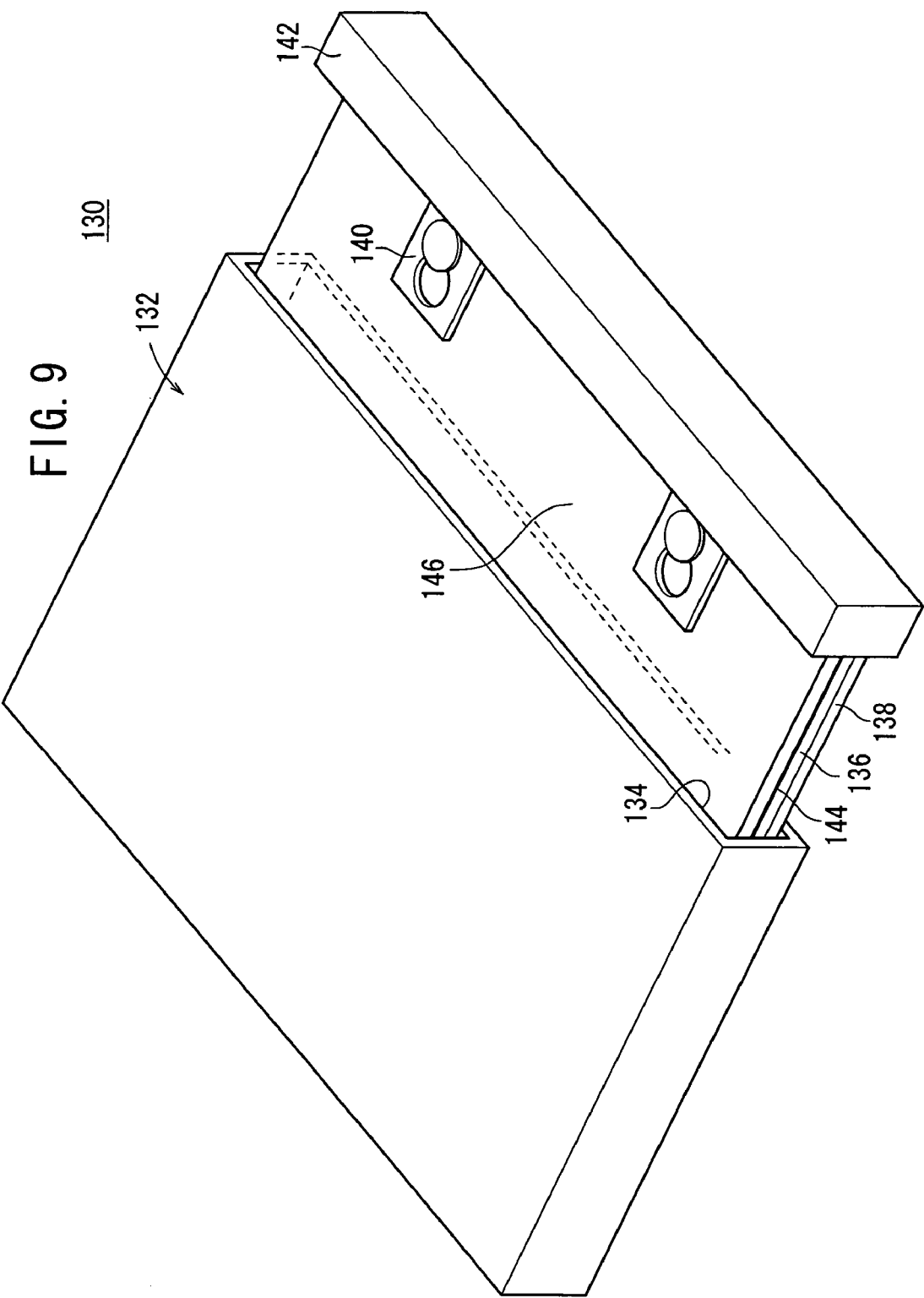
FIG. 9 is a perspective view of a radiation image forming unit according to a sixth embodiment of the present invention.

FIG. 9 shows in perspective a radiation image forming unit 130 according to a sixth embodiment of the present invention.

The radiation image forming unit 130 has a case (cassette) 132 having an opening 134 in one side. A stimulable phosphor sheet 138 fixed to a tray 136 is stored in the opening 134. A cap 142 is attached to the tray 136 by attachment means 140. When the stimulable phosphor sheet 138 is stored in the opening 134, the cap 142 covers the opening 134, shielding the interior of the case 132 against the entry of light.

A lead sheet 146 is removably attached to a reverse surface of the tray 136 where the attachment means 140 are disposed, by a double-sided tape 144, for example., The stimulable phosphor sheet 138 is secured to a surface of the tray 136 which is opposite to the reverse surface of the tray 136.

The lead sheet 146 may be removably attached to the tray 136 between the surface of the tray 136 and the stimulable phosphor sheet 138.

Figure 10:
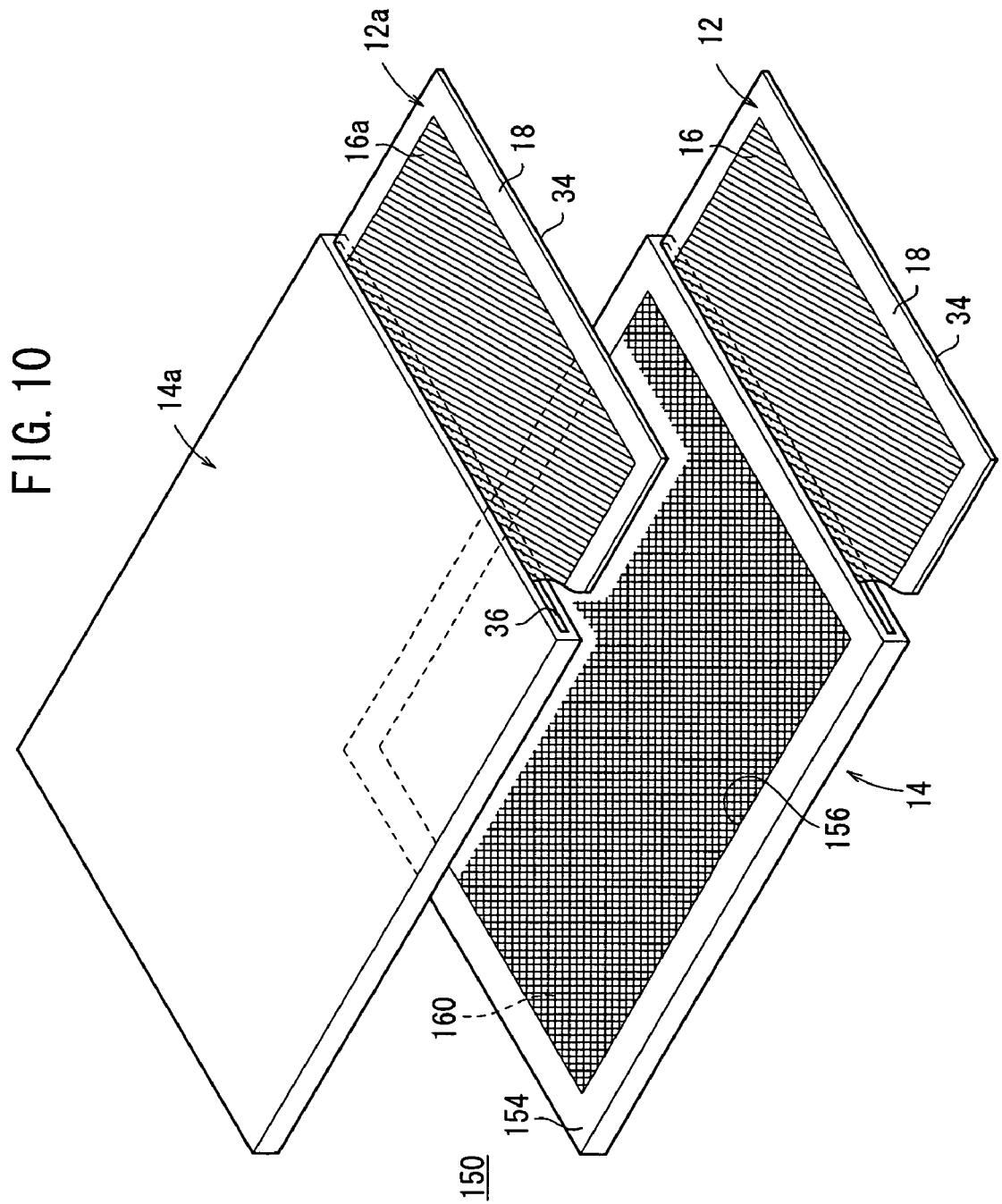
FIG. 10 is an exploded perspective view of a radiation image forming unit according to a seventh embodiment of the present invention.

FIG. 10 shows in exploded perspective a radiation image forming unit 150 according to a seventh embodiment of the present invention. The constituent elements that are identical to those of the radiation image forming unit 50 according to the second embodiment are labeled with the same reference numeral, and description thereof will be omitted.

Figure 11:
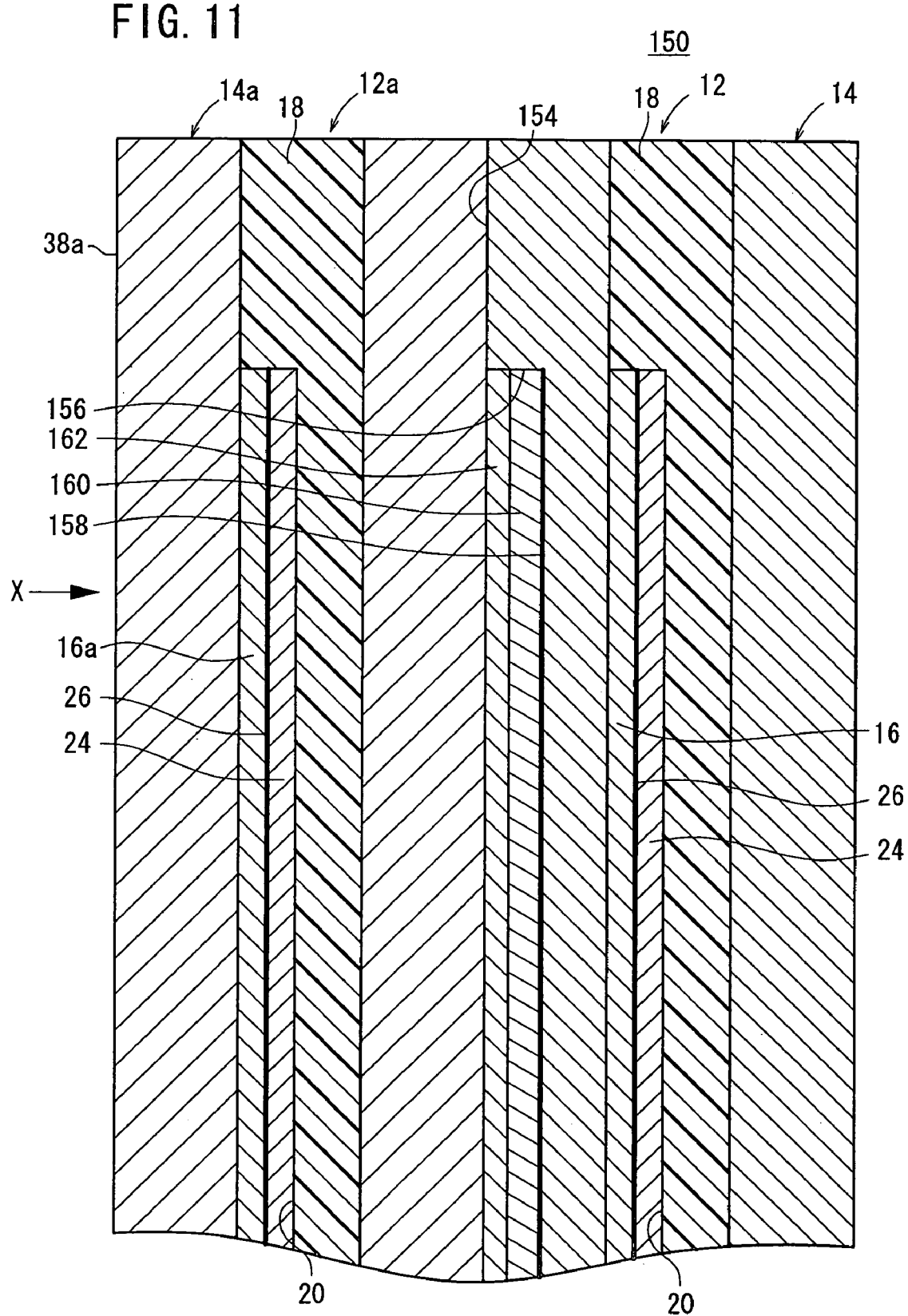
FIG. 11 is a fragmentary cross-sectional view showing two cassettes loaded into an imaging device.

The radiation image forming unit 150 has a case 14 having a rectangular recess 156 defined in its surface 154. As shown in FIG. 11, a sheet member of a different material, e.g., a copper plate 160 serving as a radiation energy separating filter for absorbing a low radiation energy component, is removably mounted in the recess 156 by a fastening member, e.g., a double-sided tape 158. A protective plastic sheet 162 is mounted on the surface of the copper plate 160. The case 14 has a small thickness of 7 mm or less, which is at most ½ of a standard value of 14 mm according to ISO 4090.

A stimulable phosphor sheet 12 stored in the case 14 comprises a carbon plate 24 embedded in a first recess 20 defined in a frame 18, and a phosphor layer 16 replaceably attached to the carbon plate 24 by a double-sided tape 26. The carbon plate 24 may be dispensed with.

According to the seventh embodiment, for performing energy subtraction processing on radiation images, as shown in FIG. 10, the case 14 and another case 14a having a small thickness of 7 mm or less which does not incorporate a sheet member of a different material are employed. The case 14a stores a stimulable phosphor sheet 12a which is identical to the stimulable phosphor sheet 12.

As shown in FIG. 11, the cases 14, 14a are loaded into an imaging device (not shown). Radiation is applied to the surface 38a of the case 14a, and the copper plate 160 is mounted to the surface 154 of the case 14 facing the case 14a.

Radiation representing the radiation image information of a subject (not shown) is applied from the surface 38a of the case 14a to the stimulable phosphor sheet 12a in the direction indicated by the arrow X in FIG. 11. Therefore, the radiation image information of the subject is directly recorded on a phosphor layer 16a of the stimulable phosphor sheet 12a. The radiation that has passed through the phosphor layer 16a is then applied to the case 14.

The copper plate 160 which is mounted in the surface 154 absorbs a low radiation energy component of the applied radiation from the case 14a. Thereafter, the radiation is applied to the phosphor layer 16 of the stimulable phosphor sheet 12, recording the radiation image information on the stimulable phosphor sheet 12. The radiation image information recorded on the phosphor layer 16 of the stimulable phosphor sheet 12 has an energy distribution with a more intensive high radiation energy component than the radiation image information recorded on the phosphor layer 16a of the stimulable phosphor sheet 12a.

Then, the cases 14, 14a are simultaneously or successively loaded into a non-illustrated reading device (processing device). In the reading device, the stimulable phosphor sheets 12, 12a are removed respectively from the cases 14, 14a, and placed in the processing unit, e.g., the reading unit. In the reading unit, the stimulable phosphor sheets 12, 12a are irradiated with stimulating light to read the radiation image information recorded on the phosphor layers 16, 16a.

As described above, the radiation image information recorded on the phosphor layer 16 in the case 14 has a more intensive high radiation energy component than the radiation image information recorded on the phosphor layer 16a in the case 14a. When the radiation image information recorded on the phosphor layers 16, 16a is subjected to energy subtraction processing, it is possible to obtain image information representing particular body structures (soft tissues of internal organs, bones, etc.) having different energy absorbing characteristics of the subject.

After remaining radiation image information is erased from the phosphor layers 16, 16a, the stimulable phosphor sheets 12, 12a are inserted back into the cases 14, 14a, respectively. The cases 14, 14a will subsequently be loaded into the imaging device for recording the radiation image information of a new subject.

According to the seventh embodiment, the copper plate 160 serving as a radiation energy separating filter is mounted in the surface 154 of the case 14. Therefore, the phosphor layers 16, 16a of the stimulable phosphor sheets 12, 12a that are stored in the respective cases 14, 14a record thereon radiation image information under different radiation energy absorbing conditions, so that image information representing particular body structures (soft tissues of internal organs, bones, etc.) having different energy absorbing characteristics of the subject can be extracted reliably and easily.

Since the cases 14, 14a have a small thickness which is at most ½ of the thickness of an ordinary case, the cases 14, 14a may be placed together on a case support base. As a result, the imaging device itself may easily be simplified in structure.

The cases 14, 14a have a simple and compact structure, and the copper plate 160 can easily be mounted and dismounted. Thus, the cases 14, 14a can be handled with ease. The stimulable phosphor sheets 12, 12a allow the energy subtraction processing to be performed efficiently, and can be used in various different imaging processes other than the energy subtraction processing.

Specifically, a sheet member of a different material such as a lead sheet for blocking backward dispersed rays, an RFP sheet for achieving high strength, a white board that can be hand-written, a magnetic sheet for delivering a cassette, or the like may removably be mounted in the recess 156 of the case 14.

The copper plate 160 may be detached from the case 14, and the case 14 may be used without the copper plate 160. When the copper plate 160 is not used, the case 14 is relatively lightweight and can be handled with ease.

Figure 12:
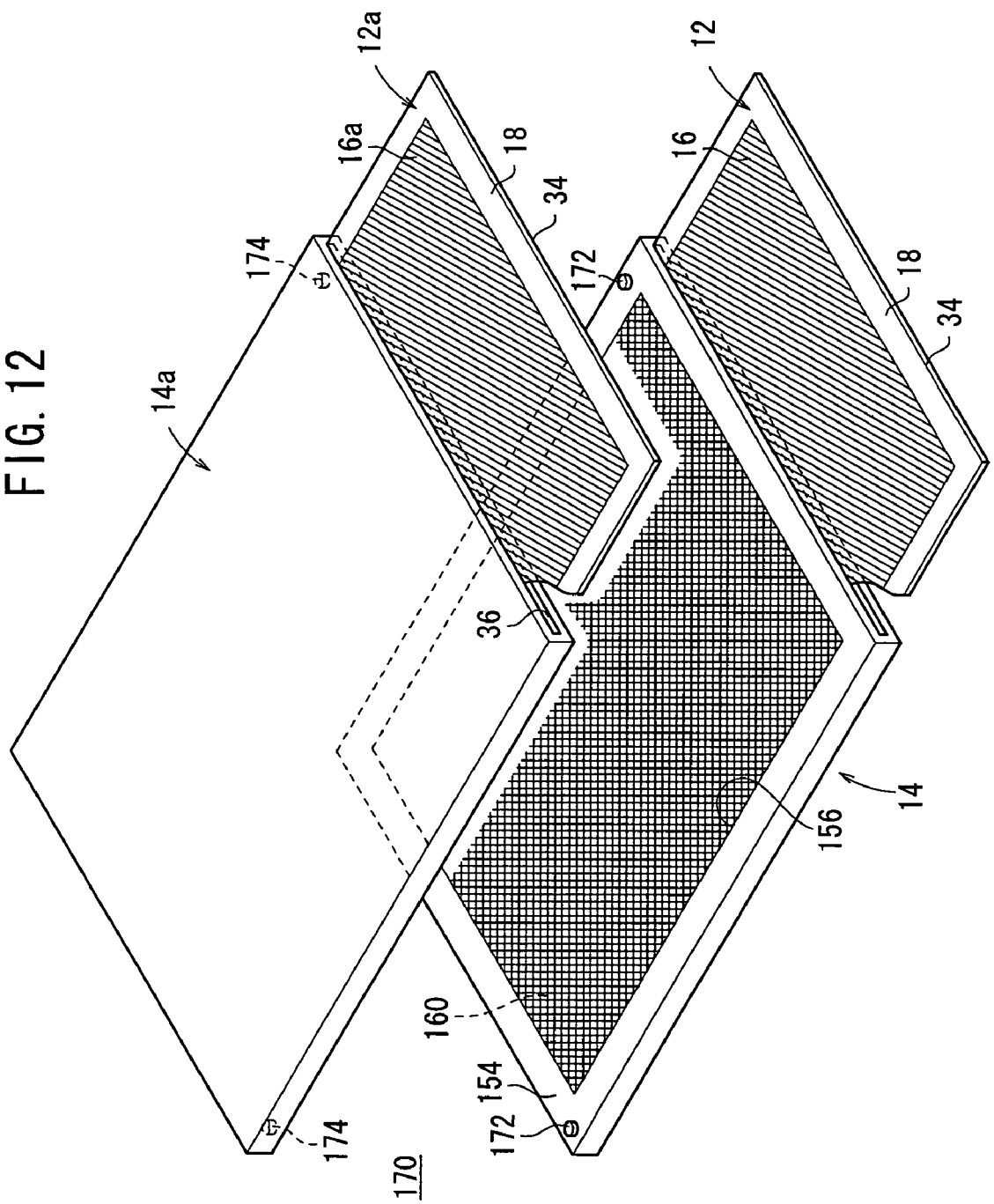
FIG. 12 is a perspective view of a radiation image forming unit according to an eighth embodiment of the present invention.

FIG. 12 shows in perspective a radiation image forming unit 170 according to an eighth embodiment of the present invention. The constituent elements that are identical to those of the radiation image forming unit 150 according to the seventh embodiment are labeled with the same reference numeral, and description thereof will be omitted.

A pair of cases 14, 14*a* are stacked together to form the radiation image forming unit 170. Circular or rectangular column-shaped protrusions 172 are provided on a surface (frame) 154 of the case 14 at diagonally opposite positions, for example, and recesses 174 are provided on a frame of the case 14*a* at positions corresponding to the protrusions 172.

In the eighth embodiment, when the cases 14, 14*a* are stacked together, the protrusions 172 are fitted in the recesses 174 so that the cases 14, 14*a* are accurately stacked together without any positional displacement. Thus, after the cases 14, 14*a* are stacked in alignment with each other, the cases 14, 14*a* are loaded into an imaging device (not shown) accurately. The radiation image information of a subject (not shown) is desirably recorded on the stimulable phosphor sheets 12, 12*a* in the cases 14, 14*a* at accurate positions, respectively.

In the eighth embodiment, two protrusions such as circular or rectangular column shaped protrusions 172 are provided in the case 14, and two recesses 174 for receiving the protrusions 174 are provided in the case 14*a*. Various modification can be made to the embodiment depending on the application as long as the cases 14, 14*a* can be positioned in alignment with each other. Various shapes or positions of the protrusions or recesses can be conceived.

Figure 13:
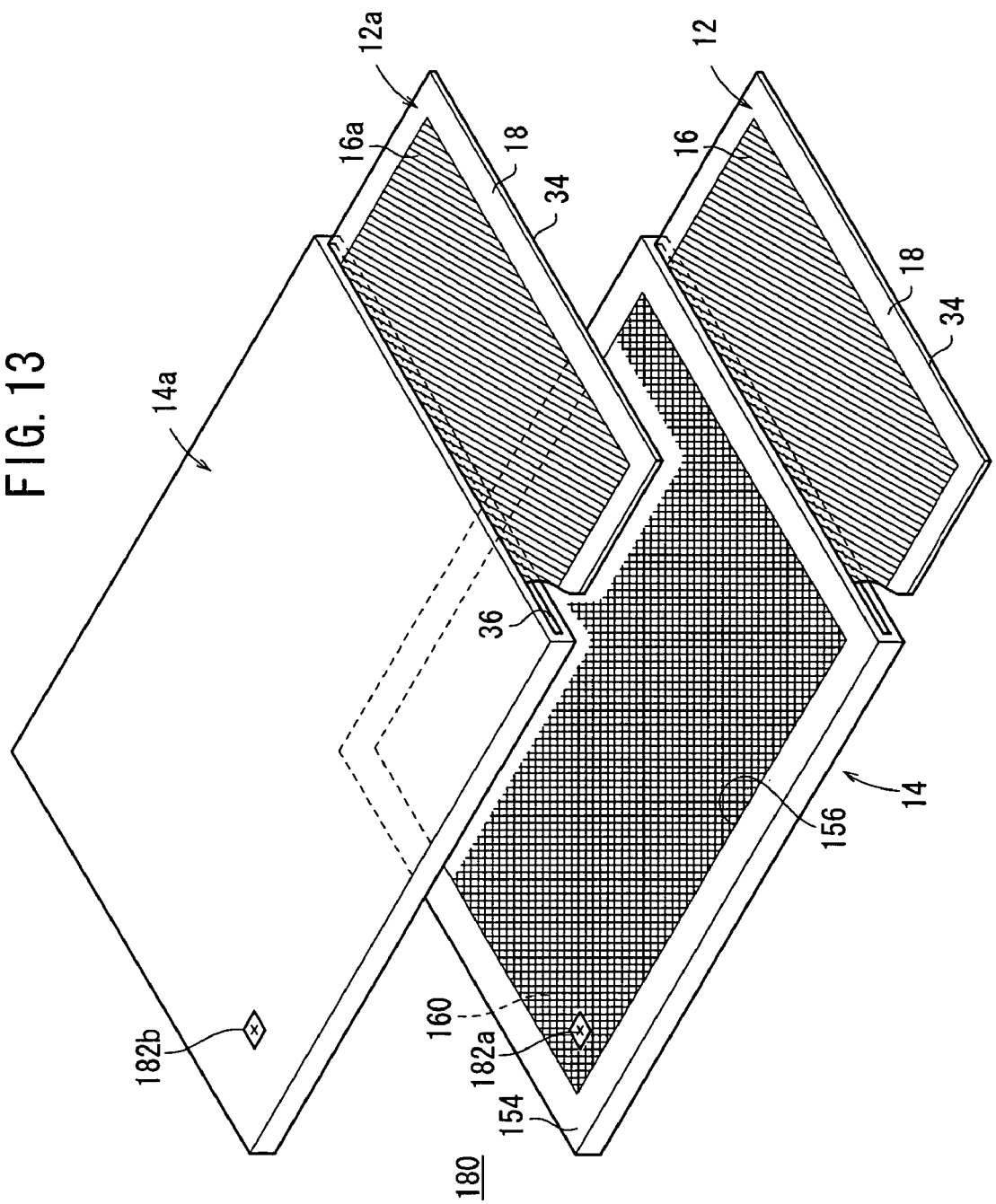
FIG. 13 is a perspective view of a radiation image forming unit according to a ninth embodiment of the present invention.
Figure 14:
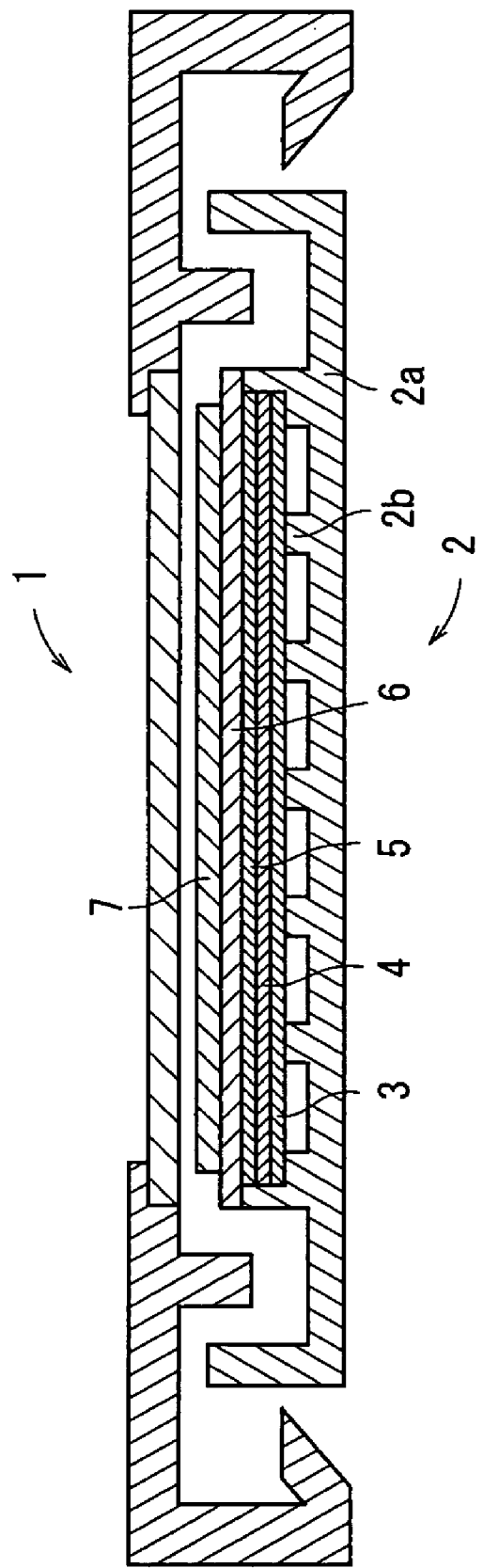
FIG. 14 is a cross-sectional view of a cassette disclosed in Japanese laid-open patent publication No. 2002-156716.
Figure 15:
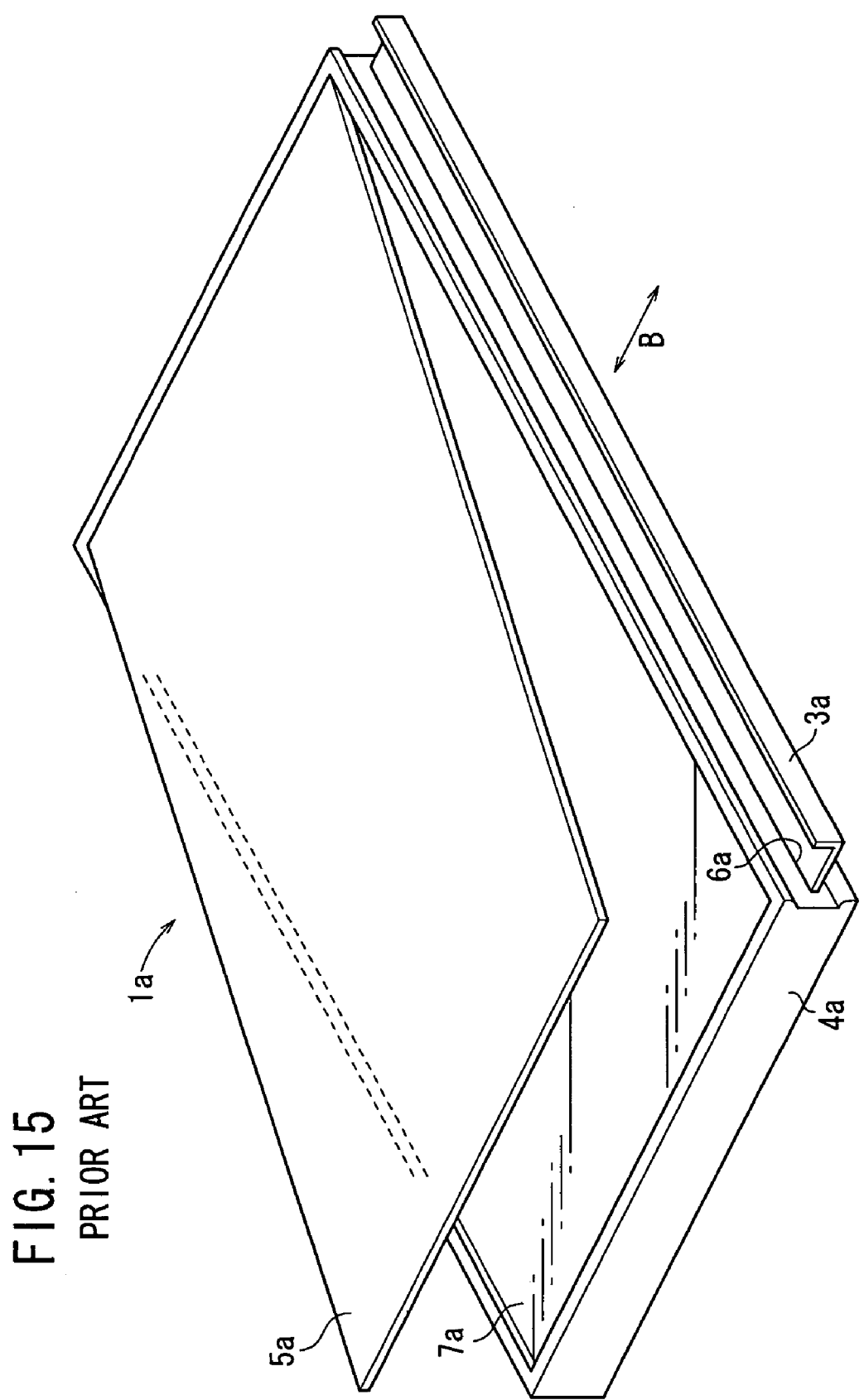
FIG. 15 is a cross-sectional view of a cassette disclosed in Japanese patent publication No. 8-33596.

FIG. 13 shows in perspective a radiation image forming unit 180 according to a ninth embodiment of the present invention.

The radiation image forming unit 180 includes a pair of cases 14, 14*a*. The case 14 has a marking 182*a* on a surface (radiation image recording area) to which radiation is applied for recording a radiation image. Likewise, the case 14*a* has a marking 182*b* on a surface (radiation image recording area) to which radiation is applied for recording a radiation image. The markings 182*a*, 182*b* are used for adjusting the positions of the radiation image recorded on the stimulable phosphor sheet 12 in the case 14 and the radiation image recorded the stimulable phosphor sheet 12*a* in the case 14*a*. For example, the markings 182*a*, 182*a* are made of lead, a coating material containing lead, or an ink containing lead.

Thus, in the ninth embodiment, in the energy subtraction processing, a radiation image of a subject (not shown) is recorded on each of the phosphor layers 16, 16*a* of the stimulable phosphor sheets 12, 12*a* in the cases 14, 14*a* which are stacked together. The radiation image recorded on the phosphor layer of the stimulable phosphor sheet 12 and the radiation image recorded on the phosphor layer of the stimulable phosphor sheet 12*a* are recorded such that these images are in alignment with each other. With the markings 182*a*, 182*b*, the positions of the images can be adjusted accurately and easily.

With the radiation image forming unit according to the present invention, a sheet member of a different material may be attached to a stimulable phosphor sheet or a case as necessary. When such a sheet member of a different material is not required, the sheet member may be removed and the stimulable phosphor sheet or the case may be used by the sheet member. Furthermore, sheet members of various different materials having different thickenesses may be used replaceably.

The radiation image forming unit can make itself easily adaptable to different imaging applications and conditions. When a sheet member of a different material is not required, the sheet member may be removed and the radiation image forming unit may be used without the sheet member. In this case, the radiation image forming unit is reduced in overall weight. The radiation image forming unit is used in various applications. The radiation image forming unit is lightweight, and can be handled with ease.

In the radiation image forming cassette according to the present invention, a sheet member of a different material such as a lead sheet for blocking backward dispersed rays, an RFP sheet for achieving high strength, a white board that can be hand-written, a magnetic sheet for delivering a cassette, a sheet on which a scale is printed, a sheet on which imaging positions are printed, a sheet on which a lead mark is provided or the like can removably be mounted on at least one surface of the cassette.

Depending on the application of the radiation image forming cassette, any of various sheet members may be mounted on the surface of the cassette. A process of manufacturing the cassette is easily simplified. The radiation image forming cassette allows various processes to be performed efficiently in connection therewith, and the radiation image forming cassette is economical.

Although certain preferred embodiments of the present invention have been shown and described in detail, it should be understood that various changes and modifications may be made without departing from the scope of the appended claims.

What is claimed is:

1. A radiation image forming unit comprising:
    a stimulable phosphor sheet assembly which contains a phosphor layer, and which is repeatedly usable for recording the radiation image information of a subject based on radiation applied thereto and erasing the recorded radiation image information;
    a cassette for storing said stimulable phosphor assembly; and
    a sheet member of a different material from said phosphor layer is attached to said stimulable phosphor sheet assembly,
    wherein said stimulable phosphor sheet assembly has a first recess, said sheet member of the different material being detachably mounted in said first recess by a fastening member.

2. A radiation image forming unit according to claim 1, wherein said stimulable phosphor sheet assembly has a frame, said first recess being defined in a first surface of said frame, and said stimulable phosphor sheet assembly having said phosphor layer detachably mounted in a second recess defined in another surface of said frame.

3. The radiation image forming unit according to claim 1, wherein said fastening member is a double-sided tape.

4. A radiation image forming unit comprising:
a stimulable phosphor sheet assembly which contains a phosphor layer, and which is repeatedly usable for recording the radiation image information of a subject based on radiation applied thereto and erasing the recorded radiation image information;
wherein said stimulable phosphor sheet assembly has a first recess, said phosphor layer being detachably mounted in said first recess by a fastening member;
and a cassette for storing said stimulable phosphor sheet assembly,
wherein a sheet member of a different material is attached to said cassette and
wherein said cassette comprises:
a frame around said stimulable phosphor sheet assembly; and
a light shield plate detachably mounted on said cassette, a lid being angularly movably mounted on a portion of said light shield plate;
said sheet member of the different material being detachably mounted on an inner surface of said light shield plate.

5. A radiation image forming unit comprising:
a stimulable phosphor sheet assembly which includes a phosphor layer, and which is repeatedly usable for recording the radiation image information of a subject based on radiation applied thereto and erasing the recorded radiation image information;
wherein said stimulable phosphor sheet assembly has a first recess, said phosphor layer being detachably mounted in said first recess by a fastening member; and
cassette for storing said stimulable phosphor sheet assembly;
wherein a sheet member of a different material is attached to said cassette, and
wherein said cassette comprises:
a frame for storing said stimulable phosphor sheet assembly;
and a lid openably and closably mounted on said frame;
said sheet member of the different material being detachably mounted on an inner surface of said lid.

6. A radiation image forming unit comprising:
a stimulable phosphor sheet assembly which includes a phosphor layer, and which is repeatedly usable for recording the radiation image information of a subject based on radiation applied thereto and erasing the recorded radiation image information;
wherein said stimulable phosphor sheet assembly has a first recess, said phosphor layer being detachably mounted in said first recess by a fastening member;
and a cassette for storing said stimulable phosphor sheet assembly,
wherein a removable sheet member of a different material is removably attached to said cassette, and
wherein said cassette comprises a tray for being stored in an opening defined in a side of said cassette, said tray having:
a cap for closing said opening;
said removable sheet member of the different material; and
said stimulable phosphor sheet assembly.

7. A radiation image forming cassette for storing a stimulable phosphor sheet assembly which includes a phosphor layer, and which is repeatedly usable for recording the radiation image information of a subject based on radiation applied thereto and erasing the recorded radiation image information,
wherein said stimulable phosphor sheet assembly has a first recess, said phosphor layer being detachably mounted in said first recess by a fastening member;
said radiation image forming cassette having a sheet member of a different material from the phosphor layer, said sheet member being mounted on at least one surface of the radiation image forming cassette,
wherein said sheet member is removably attached to a surface of said cassette which is exposed to radiation applied to said stimulable phosphor sheet.

8. A radiation image forming cassette according to claim 7, wherein said surface of the radiation image forming cassette has a second recess, said sheet member of the different material being mounted in said second recess.

9. A radiation image forming cassette according to claim 7, wherein said sheet member of the different material is removably attached to the radiation image forming cassette.

10. A radiation image forming cassette according to claim 7, wherein said radiation image forming cassette has a thickness which is at most ½ of a standard value according to ISO 4090.

11. A radiation image forming cassette according to claim 10,
wherein said cassette and another said cassette form a pair of cassettes which are stacked together,
wherein protrusions are formed on a frame of one of said pair of cassettes, and second recesses are formed on a frame of the other of said pair of cassettes, respectively, and
wherein said protrusions are fitted in said second recesses such that said pair of cassettes are in alignment with each other.

12. A radiation image forming cassette according to claim 10, wherein a marking is provided on a radiation image recording area of said cassette for adjusting a position of a radiation image recorded in said radiation image recording area.

* * * * *